(12) United States Patent
Constable

(10) Patent No.: US 6,249,648 B1
(45) Date of Patent: Jun. 19, 2001

(54) CAMERA FLASH CIRCUIT WITH OPTICAL DATA RECORDING CIRCUIT

(75) Inventor: Douglas W. Constable, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/431,795

(22) Filed: Nov. 2, 1999

Related U.S. Application Data

(63) Continuation-in-part of application No. 09/394,555, filed on Sep. 10, 1999.

(51) Int. Cl.⁷ .................................................. G03B 17/26
(52) U.S. Cl. ............................ 396/206; 396/317; 396/6
(58) Field of Search ............................. 396/6, 205, 206, 396/315, 317

(56) References Cited

U.S. PATENT DOCUMENTS 6,038,408 * 3/2000 Constable ............................ 396/317
6,091,898 * 7/2000 Hata ......................................... 396/6

* cited by examiner

Primary Examiner—W. B. Perkey
(74) Attorney, Agent, or Firm—Francis H. Boos, Jr.

(57) ABSTRACT

In a camera having a single battery cell power source, a flash apparatus is provided in combination with an optical data recording circuit in which energy to illuminate an LED illumination device in the recording circuit is derived from charging current through the flash capacitor generated by a "one touch" self oscillating charging circuit. A resistor element is connected in circuit with the flash capacitor across the charge voltage output terminals of the charging circuit. An oscillation start terminal of the charging circuit and the illumination device of the recording circuit are coupled through respective normally reverse biased diodes to the normally open contact of a flash synchronization switch. Closure of the synchronization switch forward biases the diodes to start the charging circuit and to connect the illumination device across the resistor element to activate the illumination device during the brief period the flash synchronization switch is closed.

10 Claims, 4 Drawing Sheets

CAMERA FLASH CIRCUIT WITH OPTICAL DATA RECORDING CIRCUIT

CROSS-REFERENCE TO RELATED APPLICATIONS

This is a continuation-in-part of application U.S. Ser. No. 09/394,555, filed Sep. 10, 1999 entitled "Camera Flash Circuit with Optical Data Recording Circuit".

Cross-reference is made to commonly assigned, U.S. application Ser. No. 09/149,688, now U.S. Pat. No. 6,054,814 entitled "Camera Flash Charging Apparatus for Low Cost Single Use Camera".

FIELD OF THE INVENTION

This invention relates to the field of flash apparatus typically employed in low cost single use cameras and, in particular, to such flash apparatus used to provide operating energy to an optical data recording circuit.

BACKGROUND OF THE INVENTION

So-called "one-touch" flash charging circuits are in common use in flash apparatus employed in single use cameras. Such circuits, as exemplified in commonly assigned U.S. Pat. No. 5,870,639, include a self oscillating circuit coupled through a voltage step-up transformer and rectifier diode to a flash capacitor in the flash illumination circuit. In the exemplary charger circuit of the '639 patent, oscillation is initially started by depressing a momentary, "one touch-"switch which applies a forward bias to a transistor base terminal in the oscillation circuit. In the above referenced copending application Ser. No. 09/149,688, a feedback path is provided that is directly responsive to the charge voltage on the main flash capacitor to turn off the self oscillating circuit when the flash capacitor reaches full charge of, for example, 320 volts. To automatically restart the oscillator after taking a picture, a normally reverse biased diode is connected between the start terminal of the oscillator circuit and a shutter actuated flash synchronization switch in the flash illumination circuit. During the momentary period that the flash synchronization switch is closed to initiate a flash operation, the diode is forward biased providing a momentary forward bias on the transistor base terminal of the oscillation circuit thereby re-starting the oscillator circuit to recharge the main flash capacitor.

In this copending application Ser. No. 09/149,688, an optical data recording circuit is provided with one or a pair of individually selectable LED illumination devices that allows the camera user to record on the film a selected print aspect ratio (PAR) to be used in reproducing a hard copy print from the exposed image frame on the film. Details of this encodement arrangement are set forth in specifications for the Advanced Photo System. The data recording circuit has one terminal connected to the flash synchronization switch and the other terminal connected to the charged voltage side of the main flash capacitor. When the flash synchronization switch is closed, the selected LED or LEDs in the optical recording circuit are energized by the charge voltage on the flash capacitor to become illuminated for the brief period the synchronization switch is closed, thereby optically recording the PAR data encodement on the camera film.

To ensure that there is sufficient charge voltage on the flash capacitor to energize the LED, even after long periods of non-use of the camera when the flash capacitor might normally self discharge to zero volts, the flash charging circuit is provided with a DC circuit path leading from the battery power source to the flash capacitor so that the flash capacitor never discharges below the level of the battery voltage. In the embodiment disclosed in the application, two battery cells are used as the power source. Since an LED typically requires only about 1.7 volts to initiate illumination, there is always sufficient residual charge voltage on the flash capacitor to cause the LED or LEDs to illuminate, even if the batteries have lost some of their voltage output as a result of exposing a number of the available frames on the film strip. It is known that AA batteries typically have a fresh voltage output of about 1.6 volts per battery (3.2 volts for the pair). Nearing the end of a roll of film, the individual battery output voltage typically declines to about 1.4 volts per cell (2.8 volts for the pair). Thus, in the above mentioned circuit, there is always sufficient voltage to energize the LEDs which only require about 1.7 volts to be illuminated.

For cost competitive reasons, there is a desire to provide combined flash apparatus and optical data recording circuits of the type described that operate effectively and reliably from a single AA battery of nominal 1.5 volt rating. As can be seen from the above discussion, it is generally not feasible to energize an LED illumination device from a single AA battery since even the 1.6 volt of a fresh battery would be insufficient to adequately illuminate the LED thereby losing ability to record the desired PAR encodements on the film.

In U.S. Pat. No. 5,784,658, a solution to the problem is proposed in which an LED-based optical recording circuit derives is LED operating voltage from flyback pulses derived in the primary or tertiary winding of the step-up transformer of the flash charging circuit. Such pulses are inherently of high enough voltage to ensure illumination of the LED or LEDs irrespective of the normal decline in battery output voltage. An activating circuit driven by closure of the flash synchronization switch ensures that the flash charging circuit is turned on so as to provide pulses required to drive the LED optical recording device. If the flash capacitor is fully charged at the time the flash charging circuit is turned on, the frequency of the flyback pulses is sufficiently high to create the necessary energizing pulses for the LED during the period that the flash synchronization switch is closed, usually a period of about 700 microseconds. On the other hand, if the flash capacitor is in a fully discharged or almost fully discharged state at the time the synchronizing switch is closed to start the charging circuit, the frequency of the flyback pulses is so low during the initial startup phase that no flyback pulse may occur during the brief time that the flash synchronization switch is closed. In such an instance, even though the flash charging circuit is started, no optical data recording occurs. Japanese patent publications 11-84,511 and 11-84512 propose the addition of circuitry intended to overcome this difficulty. In one case, a timer circuit is added to ensure that the flash charging circuit remains on long enough to capture the necessary flyback pulses needed to energize the LED. In another case, a flash capacitor decoupling circuit is added to initially decouple the flash capacitor from the charging circuit to avoid the adverse effect the discharged flash capacitor has on frequency of the flyback pulses. Clearly, the addition of such circuitry is counterproductive to the intended result of reducing cost by eliminating one of battery cells in the power source.

There is therefore a need for a simple, low cost combined flash apparatus and optical data recording circuit that works effectively and reliably in the camera utilizing a single cell battery (1.5 volts) even in the case when the flash capacitor may be fully discharged at the time the flash charging circuit is re-started to provide energy for activating the optical data recording device.

SUMMARY OF THE INVENTION

In accordance with the invention, there is provided a flash apparatus and optical data recording circuit combination for a camera having a battery power source having an output voltage that decreases with degree of use, wherein the combination comprises a flash charging circuit coupled to said battery power source, the charging circuit having a self-oscillating circuit, a voltage step-up transformer and first and second charge voltage output terminals. The combination also comprises a flash illumination circuit which includes a flash capacitor and a resistor element connected in circuit across said first and second charge voltage output terminals and includes a flash synchronization switch coupled to said self-oscillating circuit to initiate self-oscillation upon closure of the synchronization switch. The combination further comprises an optical data recording circuit that includes an illumination device for recording data on film in the camera. The illumination device, preferably an LED, has a turn-on voltage characteristic such that the battery output voltage is insufficient to turn on said illumination device at least at some point during normal use of the camera. To avoid this problem, the illumination device is connected to the resistor element to be energized by voltage across the resistor element resulting from charging current through the flash capacitor when the flash charging circuit is turned on by closure of said flash synchronization switch.

In a presently preferred embodiment of the invention, a DC voltage path is provided in the flash charging circuit from the battery power source to the flash capacitor to maintain a minimum voltage charge on the flash capacitor. Also, reverse biased diodes are coupled respectively between the synchronization switch and each of the flash charging and optical data recording circuits to isolate the latter two circuits from the flash illumination circuit when the synchronization switch is open and to couple these latter two circuits to a battery power source return path for the period that the synchronization switch is closed.

BRIEF DESCRIPTION OF THE DRAWINGS In the drawings:

FIG. 1 is a diagrammatic illustration of a single use camera in which the present invention is particularly useful;

FIG. 2 circuit diagram illustrating a presently preferred embodiment of the present invention;

DETAILED DESCRIPTION

Figure 1:
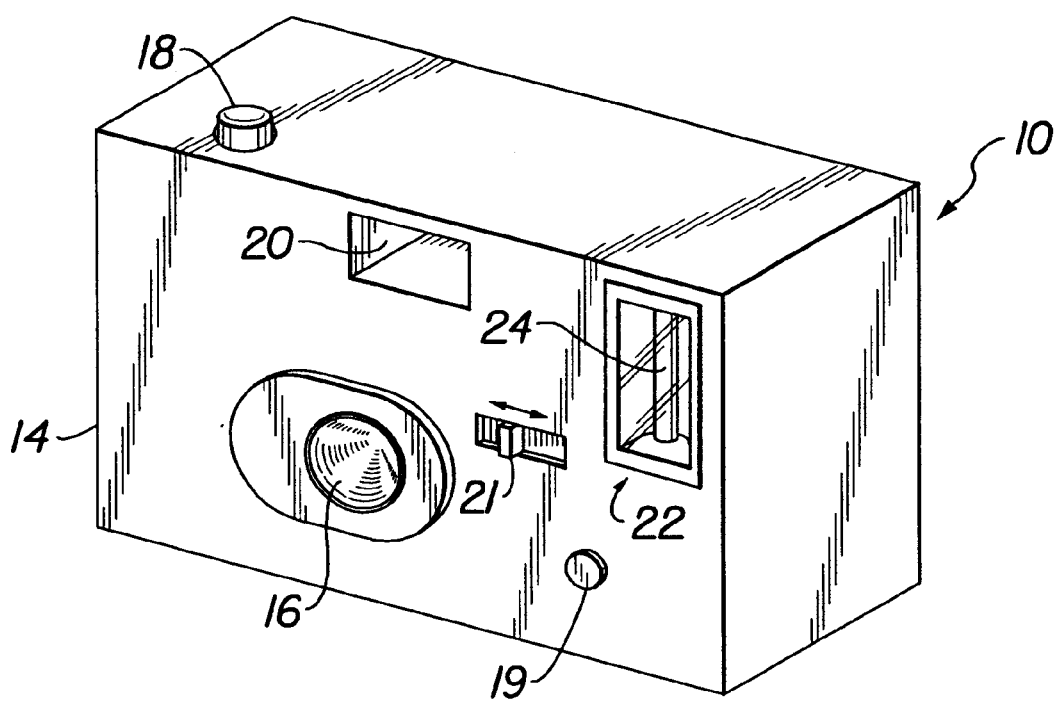

Referring to FIG. 1, there is depicted a low cost, single use camera 10 including a body 14, an optical system 16, a viewfinder and a flash device 22 including a flash tube 24. A shutter button 18 initiates a picture taking sequence which opens and closes a shutter (not shown) to expose the film through optical system 16. Opening of the shutter also actuates an internal flash sync switch to a closed position, thereby initiating supplemental scene illumination from flash tube 24. A "one-touch" button 19, operable by the camera user, initiates a flash charging cycle to charge a flash capacitor to provide energy for operation of the flash tube 24. The camera is pointed at the intended subject with the aid of viewfinder 20. A slide switch 21 is provided for selection by the camera user of image frame aspect ratio data to be recorded on the film as will be described in more detail below.

Figure 2:
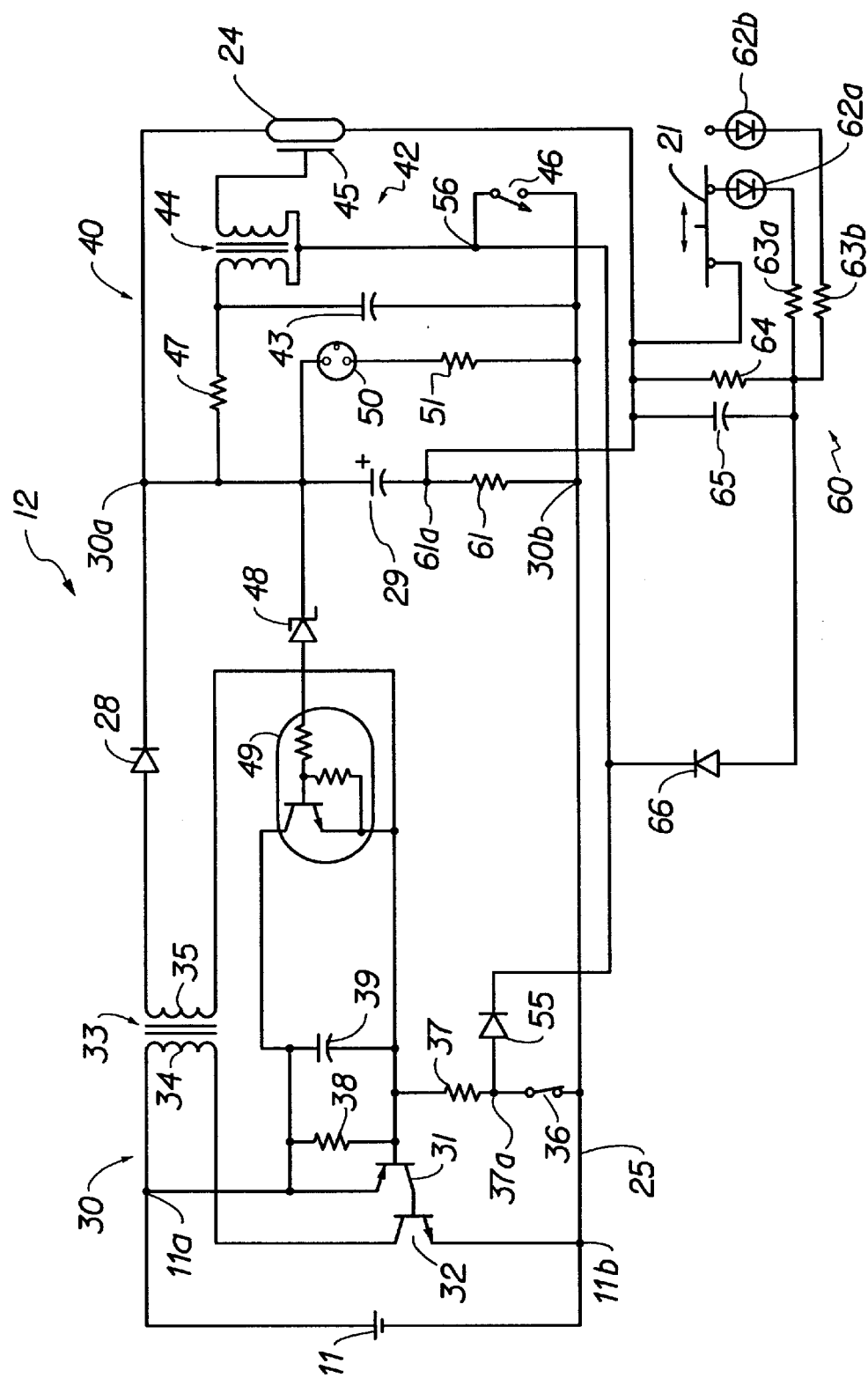

Turning now to FIG. 2, there is shown a presently preferred embodiment of a circuit arrangement for the camera 10 comprising a flash apparatus 12 and an optical data recording circuit 60. Battery 11 comprises a battery power source for the camera. The illustrated battery is a single cell battery typically having an output voltage of about 1.6 volts when the battery is fresh which can decline to a lesser voltage of about 1.4 volts over the course of exposing a 24 frame roll of film with flash operation used for each exposed frame. Apparatus 12 includes a self-oscillating flash charging circuit 30 and a flash illumination circuit 40. Flash charging circuit 30 comprises first and second battery voltage supply terminals 11a and 11b which are connected to the positive and negative terminals of battery 11, respectively, when the battery is inserted into the camera. Terminal 11b is part of a common circuit return path 25. Charging circuit 30 further comprises first and second oscillating transistors 31, 32, step-up oscillation transformer 33 having primary winding 34 and secondary winding 35, and a rectifier diode 28. A manually operated, normally open, momentary switch 36, closable by depression of "one-touch" button 19 on camera 10, is coupled from the negative battery voltage supply terminal 11b via common circuit path 25 and resistor 37 to the base of first oscillation transistor 31. A static immunity suppression resistor 38 and duty cycle efficiency control capacitor 39 are coupled across the emitter/base junction of transistor 31. Terminals 30a and 30b comprise charge voltage output terminals. The flash charger circuit is provided with a DC circuit path from battery voltage supply terminal 11a to charge voltage output terminal 30a and comprises resistor 38, transformer secondary winding 35 and rectifier diode 28.

Flash illumination circuit 40 comprises flash capacitor 29, flash tube 24 and a flash trigger circuit 42. In accordance with an aspect of the invention, flash capacitor 29 is connected in circuit with a resistor element 61 across charge output terminals 30a and 30b such that when charger circuit 30 is operating to charge flash capacitor 29, a voltage is generated across resistor element which serves as an energizing source for optical data recording circuit 60 described below. Flash trigger circuit 42 conventionally includes an isolation resistor 47, trigger capacitor 43, voltage converting transformer 44, flash triggering electrode 45 and a flash synchronization switch 46. Switch 46 typically is interconnected with the camera shutter mechanism so as to be closed momentarily when the shutter is opened by depression of camera shutter button 18.

A neon ready light 50 and current limiting resistor 51 are connected in series across flash capacitor 29 to inform the camera user when sufficient charge is stored in capacitor 29, e.g. +270 volts, to sustain a flash illumination from flash tube 24. An oscillation arresting feedback circuit, including NPN oscillation arresting transistor 49 and a voltage sensing device 48 such as a 320 volt zener diode or varistor, is coupled from the upper terminal of the flash capacitor to the emitter base junction of oscillation transistor 31 with the emitter/collector terminals of transistor 49 being coupled across the emitter base junction of oscillation transistor 31. An automatic oscillation restart circuit path is coupled from the upper terminal 56 of synchronization switch 46 to the oscillation circuit 30 and comprises diode 55 having its anode coupled via resistor 37 to the base of oscillation transistor 31 and its cathode coupled to terminal 56. In this manner, diode 55 is normally reverse biased by the positive potential on terminal 56 to isolate the oscillation circuit from the flash illumination circuit except during the momentary closure period of synchronization switch 46.

In the Advanced Photo System, there is provision for recording optical data bits on the film to indicate the format of the resultant photoprint that the camera user wants. For this purpose, the circuit of FIG. 2 includes an optical data recording circuit 60 that is energized by the voltage generated across the resistor element 61 by the charging current flowing through flash capacitor 29. In the embodiment illustrated in FIG. 2, circuit 60 comprises a pair of light emitting diodes (LED) 62a and 62b having their respective cathodes connected via current limiting resistors 63a and 63b to the anode of isolation diode 66. The cathode of diode 66 is connected to the normally open terminal 56 of flash synchronization switch 46. Diode 66 is normally reverse biased by the positive potential on terminal 56 except during the momentary period of the closure of switch 46. The anodes of LEDs 62a and 62b are coupled through the contacts of data bit slide selector switch 21 to terminal 61a at the upper end of resistor element 61. One of the LED circuits can be eliminated if the camera design requires the selective recording of only a single data bit.

Considering now the operation of the flash apparatus and data recording circuit of the invention, when momentary switch 36 is closed, a forward bias is applied to the base of transistor 31 turning on both transistors 31 and 32 to initiate oscillatory pulses through primary winding 34. These pulses are stepped up in the secondary winding 35 and rectified by diode 28 to charge main flash capacitor 29. Feedback current from the secondary winding 35 sustains the oscillatory condition, even after switch 36 has been opened by release of the "one-touch" button 19. The charging current through flash capacitor 29 produces a voltage across resistor element 61 which, as will be seen, serves as an energizing source for the optical data recording circuit 60.

When the flash capacitor charge voltage reaches full charge of +320 volts, sensor 48 momentarily conducts, applying a positive bias on the base of transistor 49. This drives transistor 49 into conduction shunting the base of oscillation transistor 31 to the positive terminal of battery 11 thereby turning off transistor 31 and stopping the oscillation in the charging circuit 30.

Trigger capacitor 43 is charged by current flow through charging transformer secondary winding 35 at the same time and in similar manner as flash capacitor 29. When switch 46 is closed at the start of a picture-taking sequence, switch terminal 56, which is at the positive charge potential of flash capacitor 29, is pulled momentarily to the potential level of the negative terminal of battery 11 via common return path 25 and battery voltage supply terminal 11b. Trigger capacitor 43 then discharges through the primary winding of voltage converting transformer 44, inducing a high voltage pulse of about 4.0 kilovolts in the secondary winding which is applied to triggering electrode 45. This causes ionization of the gas in flash discharge tube 24 resulting in flash capacitor 29 discharging through the flash tube 24, producing flash illumination.

The closure of switch 46 also initiates the restart of oscillation in the flash charging circuit 30. Closing switch 46 causes the normally reverse biased diode 55 to become forward biased by the connection of its cathode through the closed contacts of switch 46 and common return path 25 to the negative battery voltage supply terminal 11b. This action draws current through the emitter base junction of transistor 31 thereby initiating oscillation in the oscillator circuit 30 in the same manner of closure of the "one touch" actuated switch 36.

Figure 3A:
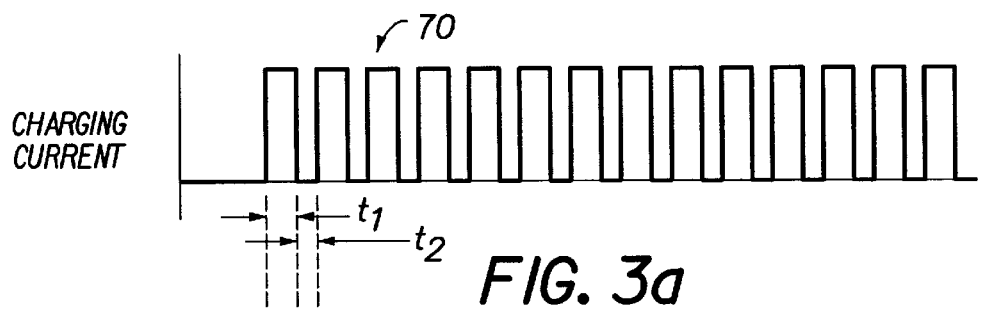
FIGS. 3a and 3b are waveform diagrams illustrating operation of the optical data recording circuit of FIG. 2 with the flash capacitor initially fully charged.
Figure 3B:
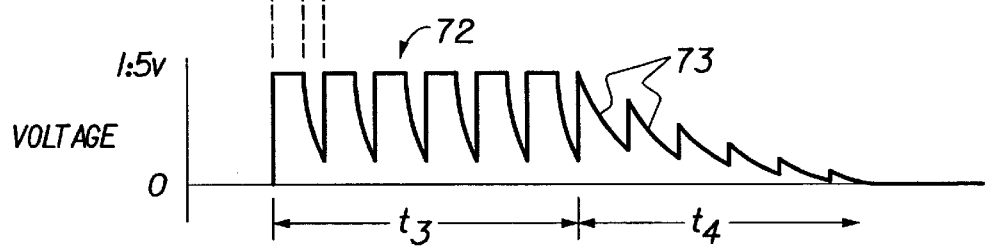

The operation of optical recording circuit 60 will be described with the assumption that selector switch 21 is in the position shown in FIG. 2 connecting LED 62a to the upper end of resistor element 61 at terminal 61a. It will be appreciated that the operation is the same if switch 21 is positioned to connect both LEDs to terminal 61a. Referring to FIGS. 3a and 3b, at the time $t_0$, when synchronization switch 46 is closed to initiate flash and restart the oscillator circuit 30 through diode 55, diode 66 is forward biased to couple the optical data recording circuit across resistor element 61. In FIG. 3a, pulse waveform 70 represents pulses of charging current through flash capacitor 29 wherein $t_1$ is the charging pulse period and $t_2$ is the flyback pulse period. In FIG. 3b, waveform 72 represents the voltage across LED 62a wherein $t_3$ is the period of time, approximately 700 microseconds, that synchronization switch 46 is closed and diode 66 is forward biased, and $t_4$ is the ensuing period with switch 46 open and diode 66 reverse biased. During period $t_3$, LED 62a is biased on by the voltage across resistor element 61 and illuminated by the charging current through capacitor 29. When synchronization switch 46 opens, the charging operation continues until flash capacitor 29 is fully charged and the charger oscillation circuit is stopped by the operation of shunt transistor 49 as described above. As long as the charging circuit is on during time period $t_4$, high voltage pulses are present on the cathode of diode 66. Even though diode 66 is reversed biased, these high voltage pulses could be conducted through internal leakage capacitance of diode 66 and cause undesired illumination of LED 62a. This effect is suppressed, however, by the inclusion of pulse suppression capacitor 65 and capacitor discharge resistor connected in parallel across the LED 62a. Capacitor 65 absorbs the high frequency pulse leaking through diode 66 that might otherwise appear as a voltage drop across the LED. Resistor 64 serves as a discharge path for capacitor 65.

The circuit of the invention just described is considered to have an advantage over circuits such as described in the aforementioned Japanese patent and applications that use flyback pulses generated in the primary or tertiary windings of the oscillation transformer of the charging circuit. In such circuits, the flyback pulse is a source of voltage higher than the 1.5 volt battery voltage and thus will illuminate an LED in an optical data recording circuit. As is well known, the flyback pulses occur at the end of each oscillation charge pulse period when the oscillation transistor has conducted long enough to drive the transformer core into saturation. If the flash capacitor is partially or fully charged, several flyback pulses will occur during the very brief period that the synchronization switch is closed thus effectively illuminating the data recording LED. This situation is represented in the waveforms of FIGS. 3a and 3b.

Figure 4A:
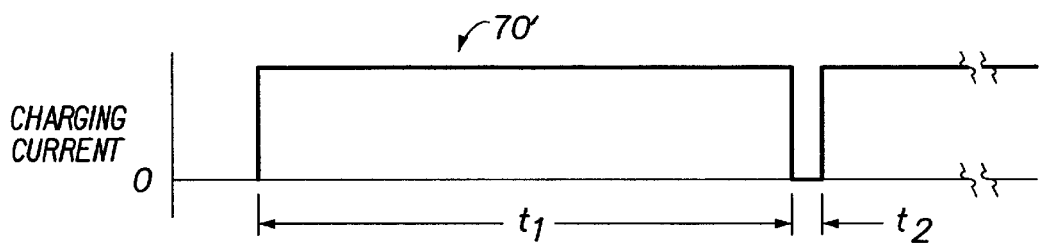
FIGS. 4a and 4b are waveform diagrams illustrating operation of the optical data recording circuit of FIG. 2 with the flash capacitor initially fully discharged.
Figure 4B:
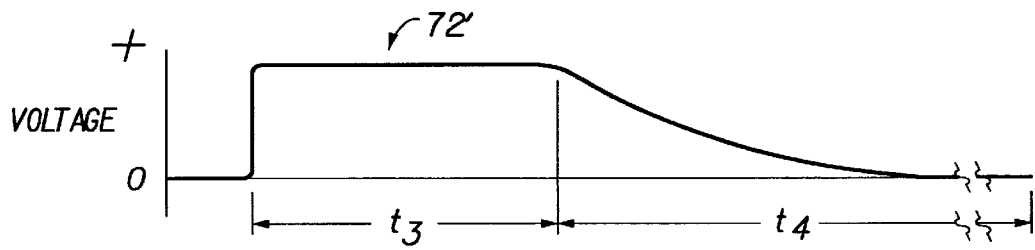

However, if the flash capacitor has become completely discharged over a long period of non-use of the camera, the oscillation transistor may be turned on for a pulse charge time period that is greater than the brief time period that the synchronization switch is closed. In such a case, the first flyback pulse $t_2$ will appear after the synchronization switch is opened and a failure to illuminate the LED will result. This situation is shown in FIGS. 4a and 4b wherein, in current waveform 70', the first flyback pulse period $t_2$ occurs well after the end of time period $t_3$ when the flash synchronization switch is opened. In accordance with the present invention, however, since the LED 62a derives its energization from charging current flowing through the flash capacitor 29 and the resultant voltage 72' generated across resistor element 61 rather than from the occurrence of flyback pulses, the LED is assured of being illuminated irrespective of the initial charge condition of the flash capacitor.

Diodes 55 and 66 serve as switch elements that are normally held electronically open by the positive charge potential appearing on terminal 56 and are electronically closed by closure of the contacts of synchronization switch 46 connected the diode cathodes to the negative voltage terminal of battery 11. It will be readily appreciated that an equivalent arrangement can be structured using electromechanical, normally-open switches connected directly to common path 25 and ganged to switch 46 to be closed and opened in synchronism with the closing and opening of switch 46.

Figure 5:
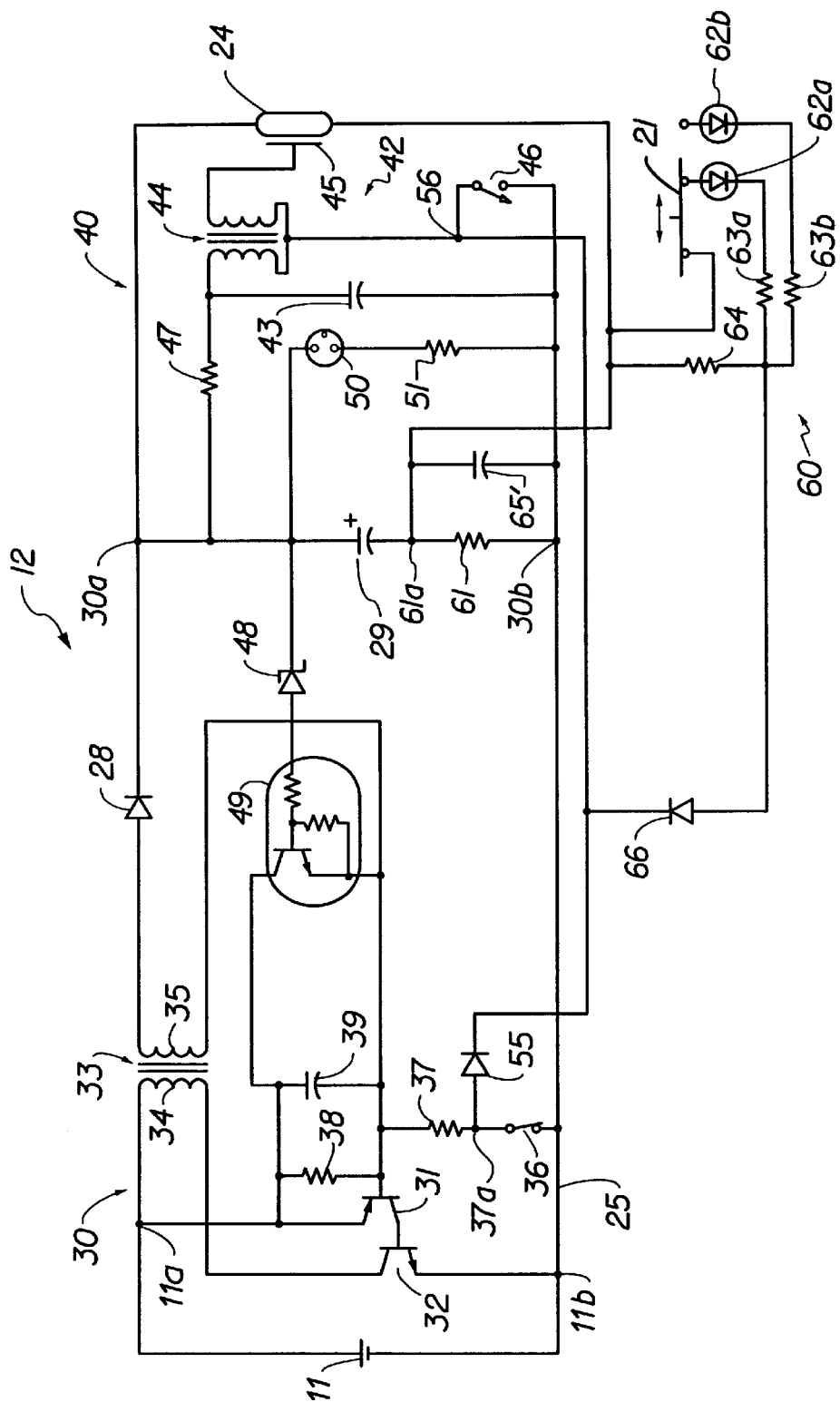
FIG. 5 is a modified circuit diagram corresponding to the circuit of FIG. 2.

As noted earlier, capacitor 65 absorbs pulses which might be conducted to the LED circuit through the leakage capacitance of reverse biased diode 66, thereby causing the potential for undesired triggering of the LED. It has been found that pulses occurring across resistor 61 during charging operation actually serve as a stronger source of unwanted pulses on the LED. The pulses across resistor 61 are synchronized with the pulses from the diode 66 in such a manner that the diode 66 becomes an ac ground for the pulse current from resistor 61 through the LED. Referring to FIG. 5, there is shown a modified version of the FIG. 2 circuit that effectively deals with elimination of the unwanted pulses while at the same time serving the additional function of providing more reliable startup of the flash charging circuit 30, particularly in the presence of weak battery conditions. The circuit of FIG. 5 is essentially the same as that of FIG. 2 except for the relocation of the pulse absorbing capacitor 65 from its original position across resistor 64 to its new position 65' in parallel across the resistor element 61. The value of the capacitor is unchanged. In this new position, capacitor 65' suppresses the pulses at their stronger source across resistor 61 instead of at the cathode of reverse biased diode 66 which is the weaker secondary source of pulses. An additional difficulty arises from the fact that resistor 61 is in series with the charging circuit oscillator feedback loop comprising the secondary 35 of transformer 33, diode 28, flash capacitor 29 and the emitter-base junctions of transistors 31 and 32. As such, resistor 61 has the effect of reducing the oscillator ac feedback loop gain which, in some instances, may cause erratic oscillator startup under weak battery power source conditions. Bypassing resistor 61 with capacitor 65' removes this difficulty by eliminating the effect of the resistor 61 on ac gain of the feedback loop.

From the foregoing, it can be seen that what has been described is a simple and low cost flash apparatus and optical data recording circuit that derives energization for the LED from flash capacitor charging current to reliably illuminate the LED irrespective of the initial charge condition of the flash capacitor. Moreover, by combining this arrangement with the use of the automatic starting diode 55 circuit with minimum residual charge level on the flash capacitor provided by the DC path between the battery and flash capacitor, there is assurance that, even if the flash capacitor has self discharged over a long period of non-use, the oscillation circuit will start on closure of the synchronization switch to provide the necessary charging current to operation the data recording circuit.

The invention has been described in detail with particular reference to certain preferred embodiments thereof, but it will be understood that variations and modifications can be effected within the spirit and scope of the invention.

| PARTS LIST | |
|---|---|
| 10 | single use camera |
| 11 | power supply battery (1.5 v) |
| 12 | flash apparatus |
| 14 | camera body |
| 16 | optical system |
| 18 | shutter button |
| 19 | "one touch" button |
| 20 | viewfinder |
| 21 | print format selection slide switch |
| 22 | flash device |
| 24 | flash tube |
| 28 | rectifier diode SM-1XF-16 |
| 29 | flash capacitor 120 ?f |
| 30 | flash charging circuit |
| 31 | oscillation transistor (MMBT3906LT1) |
| 32 | oscillation transistor (2SD879) |
| 33 | step-up oscillation transformer |
| 34, 35 | transformer windings |
| 36 | momentary switch |
| 37 | resistor (1.5K) |
| 38 | resistor (22K) |
| 39 | capacitor (4700 pf) |
| 40 | flash illumination circuit |
| 42 | flash trigger circuit |
| 43 | trigger capacitor (0.022 ?f) |
| 44 | voltage converting transformer |
| 45 | flash triggering electrode |
| 46 | flash synchronization switch |
| 47 | isolation resistor (2 Meg) |
| 48 | zener diode (320 volt) |
| 49 | oscillation arresting transistor (MMUN2211LT1) |
| 50 | neon ready light |
| 51 | current limiting resistor (3.9 Meg) |
| 55 | diode (SM-1X-16) |
| 60 | optical data recording circuit |
| 61 | resistor element (1.5K) |
| 62a, 62b | LED |
| 63a, 63b | resistor (100 ohm) |
| 64 | resistor (1 Meg) |
| 65, 65' | capacitor (4700 pf) |
| 66 | diode (SM-1X-16) |

What is claimed is:

1. Camera flash apparatus and optical data recording circuit combination for a camera having a battery power source, the combination comprising:

a flash charging circuit coupled to said battery power source, the charging circuit having a self-oscillating circuit and a step-up transformer and having first and second charge voltage output terminals;

a flash illumination circuit including a flash capacitor and a resistor element connected in circuit across said first and second charge voltage output terminals and including a flash synchronization switch coupled to said self-oscillating circuit to initiate self-oscillation upon closure of the switch; and an optical data recording circuit, including an illumination device for recording data on film in the camera, said illumination device being connected to said resistor element to be energized by voltage across said resistor element resulting from charging current through said flash capacitor when said flash charging circuit is turned on by closure of said flash synchronization switch.

2. The combination of claim 1 wherein said flash charging circuit includes an oscillation starting input terminal and a first switch element coupled between said oscillation starting input terminal and said flash synchronization switch for closure in synchronism with closure of said flash synchronization switch to restart oscillation in said flash charging circuit.

3. The combination of claim 2 wherein said first switch element is a normally reverse biased diode which his forward biased by closure of said flash synchronization switch.

4. The combination of claim 1 wherein said optical data recording circuit includes a second switch element coupled between said illumination device and said flash synchronization switch for closure in synchronism with closure of said flash synchronization switch to couple said illumination device across said resistor element substantially only while said flash synchronization switch is closed.

5. The combination of claim 4 wherein said first switch element is a normally reverse biased diode.

6. The combination of claim 5 wherein said optical data recording circuit includes a pulse suppression capacitor and a capacitor discharge resistor connected in parallel across said illumination device, said pulse suppression capacitor absorbing pulse energy conducted by leakage capacitance in said reverse biased second diode to prevent illumination of said illumination device and said capacitor discharge resistor serving as a discharge path for said pulse suppression capacitor.

7. The combination of claim 1 wherein said battery power source has an output voltage which declines during the course of normal usage of the camera in exposing a roll of film and wherein said illumination device has a turn-on voltage characteristic such that said declining battery voltage would be insufficient at some point in said camera usage to activate said illumination device.

8. The combination of claim 1 further including a capacitor coupled in parallel across said resistor element.

9. The combination of claim 5 further including a capacitor across said resistor element to suppress current from said resistor from undesirably activating said illumination device by virtue of leakage current through said normally reverse biased diode.

10. The combination of claim 1 wherein said resistor element is in an ac feedback loop for said self oscillating circuit and further including a capacitor coupled in parallel across said resistor element to eliminate effects of said resistor element on ac gain of said feedback loop.

* * * * *